United States Patent Office 3,577,361
Patented May 4, 1971

3,577,361
SYNTHETIC POWER TRANSMISSION FLUIDS
William C. Hammann, Creve Coeur, and Robert M. Schisla, Kirkwood, Mo., assignors to Monsanto Company, St. Louis, Mo.
No Drawing. Filed May 22, 1968, Ser. No. 731,254
Int. Cl. C09k 3/00
U.S. Cl. 252—73          6 Claims

ABSTRACT OF THE DISCLOSURE

An improved method of transmitting power in hydraulically-operated mechanisms which comprises using as the operative fluid certain tetraalkyl substituted alkylene-linked dicyclohexyl compounds.

---

This invention relates to improvements in the transmission of power and the lubrication of mechanical devices. More specifically, it relates to the use of superior synthetic hydrocarbon fluids in apparatus in which mechanical forces are transmitted or absorbed, e.g., in automotive transmissions, hydraulic systems, shock absorbers, hydraulic steering mechanisms, clutches and other mechanical devices.

Along with the development of various mechanisms for transmitting power has arisen the need for suitable fluids which perform essential functions in the operation of those mechanisms. Operation of these complex mechanisms often requires that the fluid function in several different capacities. The fluid not only serves as a lubricant and coolant in reducing the friction and heat developed during operation of the mechanism, but also performs other key functions. In the case of automatic transmissions for automotive vehicles, for example, the fluid functions hydrokinetically in the fluid coupling or torque converter, depending upon the type of transmission, and in the hydraulic operation of the various mechanical components of the driving unit.

In most hydraulic system the hydraulic fluid must lubricate the frictional parts of the system in addition to performing the primary function of transmitting power. The parts which are so lubricated include the frictional surfaces of the fluid pump, operating pistons, cylinders, valves and fluid motors. Many of these components are complex mechanical devices.

Conventional automatic transmissions, industrial hydraulic systems, gear reducers, and the like, generally employ functional fluids having base stocks selected from naturally occurrings oils of mineral origin. It is well known, however, that such mineral oils, even upon subsequent refining, do not possess the characteristics which enable them to perform satisfactorily in such demanding applications. Thus, it is a general practice to add small amounts of other materials to these base stocks to affect one or more of the properties thereof. Because of increasing performance requirements imposed on many functional fluids, however, it has become difficult to find adddtives which will still perform the functions for which they are added and yet not introduce other problems such as increasing corrosion and causing harmful deposits.

The useful life of any functional fluid can generally be adjudged on the basis of criteria such as the extent of viscosity increase, the extent of corrosion to metal surfaces in contact with the fluid, and the extent of deposits. Modern automatic transmissions are illustrative of a rigorous environment where the useful life of the working fluid is of great importance. The requirements place on automatic transmission fluids have become more severe in recent years as the horsepower of new automobiles has increased. At the same time, there has been an effort to lengthen the recommended interval between transmission oil changes. Oxidation stability requirements have become especially critical. Sludge and varnish formation, which are symptomatic of oxidation, create serious operating problems in the complex mechanisms of the transmission.

Modern fluids for automatic transmissions, therefore, employ highly refined mineral oil base stocks wtih multipurpose additive packages incorporated therein. Even the most modern formulated mineral oils, however, are often marginal in long term performance when subjected to the thermal and oxidative stresses found in today's automatic transmissions for motor vehicles.

Prior to the outstanding achievements of the present invention, synthetic base stocks presented little competition for mineral oils as automatic transmission fluids, primarily because synthetic fluids are often incompatible with conventional materials employed in mechanical systems of transmissions. Many synthetic fluids, for example, are known to cause corrosion when brought in contact with common metals, and can cause deleterious effects on certain non-metallic materials.

Although some synthetic hydrocarbon compounds would be acceptable from the standpoint of materials compatibility, they have often been disqualified because of unsuitable viscosity properties. Fluid viscosity is a critical parameter in most power transmission systems and this becomes especially significant in those systems which are subjected to wide ambient temperature variations, e.g., automotive transmissions. Precise and exacting qualification standards have been set up for automatic transmission fluids and viscosity properties are among the most rigidly controlled.

In the present invention it was discovered that, within the broad area of synthetic hydrocarbons, there is a class of alkylene-linked alicyclic compounds which affords substantial performance improvements in power transmitting mechanisms, particularly in automatic transmission. It has been found that at least one synthetic fluid of the present invention has oxidation stability superior to that of a leading automatic transmission fluid of mineral orign. Ths synthetic fluid has viscosity properties which make it readily adaptable to automatic transmission standards.

It is an object of the present invention, therefore, to provide an improved method of transmitting power through use of superior synthetic fluids.

Another object of the present invention is to provide an improved method of transmitting power through use of synthetic hydrocarbon fluids which possess outstanding oxidation and viscosity properties.

Still another object of the present invention is to provide an improved method of operating an automatic transmission by the use of a synthetic hydrocarbon which has superior oxidative stability.

Other objects, aspects and advantages of the present invention will become apparent from a consideration of the accompanying disclosure and the appended claims.

Broadly stated, the synthetic fluids employed in the present invention comprise tetraalkyl substituted alkylene-linked dicyclohexyl compounds wherein the cyclohexyl rings can each have one alkyl substituent. The present invention employs those compounds defined by the following structural formula:

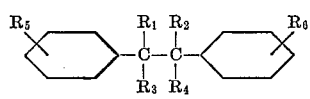

where $R_1$, $R_2$, $R_3$ and $R_4$ are $C_1$ to $C_3$ alkyl and can be the same or different, and $R_5$ and $R_6$ are selected from the group consisting of $C_1$ to $C_2$ alkyl and hydrogen, and can be the same or different.

The preferred fluid within the above formula for the purposes of the present invention is 2,3-dicyclohexyl-2,3-dimethylbutane, which can be derived by oxidative coupling of cumene followed by hydrogenation. Data are presented hereinafter to illustrate the superior oxidative stability of 2,3 - dicyclohexyl-2,3-dimethylbutane when compared to one of the best mineral base fluid formulations currently employed in automatic transmissions.

By way of example, other fluids within the scope of the present invention are 3,4-dicyclohexyl-3,4-dimethylhexane and 2,3-di(4 - methylcyclohexyl) - 2,3-dimethylbutane.

Conventional automatic transmission fluids are usually based on hydrocarbon oils which are generally paraffinic in nature. The additive package incorporated in the base stock is designed to accomplish numerous effects. Many of the additives within the package are multifunctional, thus it is not always necessary to use a separate additive for each purpose. The usual types of additives found in automatic transmission fluids are oxidation inhibitors, dispersants, metal deactivators, viscosity index improvers, anti-wear agetns, rust inhibitors, corrosion inhibitors, foam inhibitors, seal swellers and friction modifiers.

Physical conditions in the modern automatic transmission are conducive to oxidation of the working fluid. The rapid flow of fluid through the unit which brings fluid and air into intimate contact, high fluid temperatures and the catalytic effect of the various metals all combine to accelerate oxidation. The result of uncontrolled oxidation is the formation of varnish, sludge and organic acids, the latter being potentially corrosive to metal components. In addition, the fluid may thicken excessively and adversely affect performance.

A well known qualification standard for automatic transmission fluids is identified as "General Motors Standards for Automatic Transmission Fluid, Type A Suffix A." Because newer transmissions and higher output engine have placed greater demands on the transmission fluid, the General Motors Corporation developed a new fluid specification called "Dexron." "Dexron" is the registered trademark designation of the General Motors automatic transmission fluid specification which is the successor to the Type A Suffix A specification.

A Dexron type fluid was employed herein as a reference for comparison with 2,3-dicyclohexyl-2,3-dimethylbutane, the latter being an outstanding synthetic fluid within the teachings of the present invention. The reference Dexron fluid was a mineral base hydrocarbon containing an additive package and conforming to the Dexron specification. The synthetic fluid 2,3-dicyclohexyl-2,3-dimethylbutane was neat except for the addition of 1% by weight of 2,6-di-t-butyl-p-cresol, the reaso for this nominal addition tobe expalined hereinafter.

To illustrate the superior oxidative stability of 2,3-dicyclohexyl-2,3-dimethylbutane over the reference Dexron fluid, an oxidation and corrosion test was conducted according to Military Specification No. 7808D, an accepted test specification which was developed for the purpose of measuring the stability of synthetic turbine engine lubricants. In general, this test measures the inhibition period, oxygen consumption ,fluid loss, increase in viscosity, and change in physical appearance of a fluid sample after exposure for a given period at a constant temperature to a flow of dry air in the presence of metals such as aluminum, copper and iron. The exposure time and the temperature may be adjusted to change the severity of the test.

The following Tables I, II, III and IV present comparative oxidation and corrosion performance of the reference Dexron fluid and a preferred synthetic fluid of the present invention, viz, 2,3-dicyclohexyl-2,3-dimethylbutane. Test conditions for the data of Tables I through IV were as follows:

Sample size—200 cc.
Air flow—5 liters/hr. of dry air
Temperature—175° C.
Exposure time—48 hours
Metals present—Al, Cu, Fe

TABLE I.—ACIDITY

| Fluid | Initial T.A.N. | Final T.A.N. |
|---|---|---|
| Dexron fluid | 1.61 | 3.9 |
| 2,3-dicyclohexyl-2,3-dimethylbutane | 0.09 | 0.5 |

TABLE II.—100° F. VISCOSITY INCREASE

| Fluid | Initial voscosity—cs. | Final viscosity—cs. | Percentage viscosity increase |
|---|---|---|---|
| Dexron fluid | 39.03 | 52.84 | 35.4 |
| 2,3-dicyclohexyl-2,3-dimethylbutane | 29.51 | 30.50 | 3.3 |

TABLE III.—COKE AND SLUDGE FORMATION

| Fluid | Coke | Sludge |
|---|---|---|
| Dexron fluid | None | Medium. |
| 2,3-dicyclohexyl-2,3-dimethylbutane | None | None. |

TABLE IV.—WEIGHT CHANGE OF METAL SPECIMENS

| Fluid | Aluminum, mg./cm.$^2$ | Iron, mg./cm.$^2$ | Copper, mg./cm.$^2$ |
|---|---|---|---|
| Dexron fluid | +0.02 | +0.01 | −0.32 |
| 2,3-dicyclohexyl-2,3-dimethylbutane | 0.00 | 0.00 | +0.01 |

From the data reported in Tables I through IV above, it will be seen that the synthetic fluid of the present invention, viz., 2,3-dicyclohexyl-2,3-dimethylbutane, gave results superior to those of the reference Dexron fluid. With particular reference to Table IV, it will be observed that the Dexron fluid exhibited a significant degree of copper corrosion as evidenced by a weight loss of 0.32 mg./cm.$^2$ in the copper test specimen. The synthetic hydrocarbon 2,3-dicyclohexyl-2,3-dimethylbutane, on the other hand, showed no measurable weight loss in the copper specimen with which it was in contact. These corrosion results are corroborated by the comparatively high total acid number ascribed to the Dexron fluid in the data of Table I.

The importance of viscosity properties in an automatic transmission fluid has been previously emphasized. An automatic transmission fluid is required to meet certain initial viscosity standards. It follows, therefore, that any change in viscosity properties during use should be minimal. With reference to the results in Table II, it is observed that the Dexron fluid viscosity at 100° F. increased 35.4% during the 48 hour oxidation and corrosion test. This is contrasted with a viscosity increase of only 3.3% for 2,3-dicyclohexyl-2,3-dimethylbutane.

The superiority of 2,3-dicyclohexyl-2,3-dimethylbutane as a power transmission fluid was further illustrated by a second oxidation and corrosion test conducted under the same conditions previously described. Instead of adding 1% by weight of 2,6-di-t-butyl-p-cresol to the synthetic base stock, there was added 10% by weight of the same additive package found in the Dexron fluid. The 100° F. viscosity increase was only 2.1% after 48 hours and there was no evidence of sludge. The presence of the Dexron additive package, however, caused an undesirable increase in acidity, the T.A.N. being 1.15 at the start of the test and 2.6 at the completion of 48 hours. The attendant copper weight loss was 0.04 mg./cm.$^2$. These numbers are substantially higher than the results of Tables I and IV wherein the synthetic fluid contained no additive package. It is to be emphasized, therefore, that the addition of certain conventional additives, although beneficial to mineral oil, may actually impair the performance of 2,3- dicyclohexyl-2,3-dimethylbutane and other synthetic fluids taught by the present invention.

The Dexron fluid specification requires a minimum viscosity at 210° F. of 49.0 SUS, which is equivalent to 7.0 cs. It specifies a maximum Brookfield viscosity of 4000 cs. at −10° F. and 55,000 cs. at −40° F. The viscosity data for 2,3-dicyclohexyl-2,3-dimethylbutane with 1% by weight of 2,6-di-t-butyl-p-cresol are as follows:

4.826 cs. at 210° F.
32.01 cs. at 100° F.
3,150 cs. at 0° F.
19,000 cs. at −20° F.

With the addition of a minimal amount of a viscosity index improver, 2,3 - dicyclohexyl - 2,3 - dimethylbutane would conform to the viscosity standards of the Dexron specification. There are many viscosity index improvers which are suitable for use with the fluids of the present invention. Successful results may be obtained with polyalkyl methacrylates resulting from the polymerization of alkyl methacrylates in which the alkyl groups may have from about 2 to 16 carbon atoms and may be, for example, ethyl, propyl, butyl, amyl, hexyl, etc., and mixtures thereof. The alkyl groups may be mixtures such as derived from a mixture of alcohols, and in which case there may be included some alkyl groups having as low as 1 carbon atom and as high as about 18 carbon atoms. The number of carbon atoms in the alkyl group should be such that the polymer is compatible with the fluid base stock. The alkyl group is preferably a normal alkyl group, but may be a branched chain or cycloalkyl group. The molecular size of the polyalkylmethacrylate should be great enough to increase the viscosity of the base stock, yet small enough to be compatible therewith.

One example of a suitable VI improver for use with 2,3-dicyclohexyl-2,3-dimethylbutane and other fluids of this invention is a copolymer of butyl and lauryl methacrylate with a molecular weight of about 40,0000. Another example is a terpolymer of butyl methacrylate, lauryl methacrylate, and vinyl pyrrolidone wherein the molecular weight is about 40,000. Still another VI improver is polyisobutylene prepared by acid catalyzed polymerization of isobutylene up to a molecular weight betwen 20,000 and 40,000. Another is polyalkylstyrene prepared by polymerization of alkylstyrene, where the alkyl group is preferably lauryl, and the molecular weight is 45,000 to 50,000. Yet another VI improver useful in the present invention is a copolymer of vinyl acetate and alkyl fumarate having a molecular weight between 40,000 and 60,000. Alkyl acrylates such as ethyl acrylate and octyl acrylate may also be employed.

There are certain applications such as in automatic transmissions wherein additives other than viscosity index improvers are beneficial to the performance of the instant alkylene-linked cyclohexyl compounds. It may be desirable, for example, to add minor amounts of seal swellers, defoaming additives, antiwear additives, dispersants, dyes and other useful substances. It is to be understood, therefore, that those skilled in the art will visualize certain conventional additives for the purpose of enhancing one or more of the properties of the synthetic fluids taught by the present invention. It is to be stressed, however, that 2,3-dicyclohexyl-2,3-dimethylbutane, for example, because of its outstanding oxidative stability and viscosity properties is adaptable for automatic transmission use with a minimum amount of additive treatment.

The unexpected oxidative stability and viscosity stability of the class of compounds taught by the present invention is demonstrated by a comparison of 2,3-dicyclohexyl-2,3-dimethylbutane with other alkylene-linked alicyclic compounds outside the scope of this invention. The basis for comparison was the oxidation and corrosition test procedure hereinbefore described, the main exception being that the sample size was 20 grams instead of 200 cc. Thus, a 20 gram sample of each compound was exposed for 48 hours to a flow of 5 liters per hours of dry air at 175° C. in the presence of several metals. The main variables considered were inhibition period, oxygen consumption, fluid loss and increase in 100° F. viscosity. Inhibition period is defined as that exposure time where oxidation of the sample begins, i.e., where there is repeated response in the measurement of oxygen uptake. In the case of all illustrated alkylene-linked compounds other than 2,3-dicyclohexyl-2,3-dimethylbutane, the inhibition period was less than the 48 hour test duration. Each of the compounds tested was neat except for the addition of 1% by weight of 2,6-di-t-butyl-p-cresol, an oxidation inhibitor. The purpose of the oxidation inhibitor was to impart sufficient stability to all of the compounds in order to obtain meaningful qualitative results in the oxidation and corrosion test. Unless a nominal amount of inhibitor is added to those compounds with poor stability, it has been found that the inhibition period becomes unduly short relative to the 48 hour total exposure period.

For uniformity, therefore, the 1% quantity of oxidation inhibitor was added to all of the compounds tested. Because of the exceptional performance of 2,3-dicyclohexyl-2,3-dimethylbutane in the oxidation and corrosion test and because of its clean appearance after 48 hours, this compound would exhibit superior oxidation resistance without the presence of any inhibitor.

Results of the comparative oxidation and corrosion test for alkylene-linked alicyclic compounds are presented in Table V below. Total oxygen consumption, viscosity increase and fluid loss were determined at the end of 48 hours of sample exposure for all compounds.

TABLE V.—OXIDATION AND VISCOSITY PROPERTIES OF ALKYLENE-LINKED ALICYCLIC COMPOUNDS

| Compound | Inhibition period (hours) | Oxygen consumption (grams O₂/grams substrate) | 100° F. viscosity increase, percent | Fluid loss, percent |
|---|---|---|---|---|
| 2,3-dicyclohexyl-2,3-dimethylbutane | 48 | 0.0 | 2.7 | 1.1 |
| 1,1-dicyclohexyl-2-methylpropane | 18 | 0.1165 | 190.3 | 2.5 |
| 1,1-dicyclohexylpentane | 29 | 0.1278 | 111.8 | 4.5 |
| 1,2-dicyclohexylpropane | 26 | 0.1603 | 241.2 | 4.8 |
| 1,4-dicyclohexylbutane | 27 | 0.2148 | 280.6 | 6.8 |

The following Example 1 describes a method of preparing 2,3-dicyclohexyl-2,3-dimethylbutane, the preferred compound of the present invention having the chemical structure:

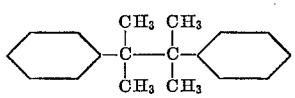

EXAMPLE 1

2,3-dicyclohexyl-2,3-dimethylbutane 2,3-diphenyl-2,3-dimethylbutane (378 g., 1.59 moles), 25 g. of 5% rhodium-on-carbon catalyst and 400 ml. of methylcyclohexane were charged to a 1-liter autoclave, flushed three times, pressurized to 1200 p.s.i. and tested for leaks. The material was heated to 60° C., 1400 p.s.i., where exothermic hydrogenation set in. The rate of hydrogenation was controlled by feed-ins from drops to 900 p.s.i. to increases of 2000 p.s.i. Most of the reduction was carried out at 100° C. over a ninety minute period at these pressures. After this treatment, the reactants were heated to 200° C., 3000 p.s.i., for 4 hours to insure complete reduction. The cooled reaction mixture was filtered, excess solvent removed in vacuo and the concentrates distilled under vacuum, B.P. 135° C./02 mm. This water-white liquid, $n_D^{25}$ of 1.5020, was free of any trace of unsaturation as evidenced by nuclear magnetic resonance analysis and exhibited purity 99.5% by vapor phase chromatograph analysis.

2,3-diphenyl-2,3-dimethylbutane was prepared by reacting 146.2 g. (1.0 mole) of di-t-butyl peroxide with 347 g. (2.88 moles) of cumene. Unreacted cumene (3.47 g., 2.88 moles) was recovered by distillation under reduced pressures (B.P. 55°/30 mm.). The concentrated reaction products crystallized upon cooling. Recrystallization from ethanol gave 140 g. of 2,3-diphenyl-2,3-dimethylbutane, M.P. 119–120° C.

The recrystallization step of Example 1 was for the purpose of removing impurities which can occur in the dimerization process. The dimerization of cumene yields primarily 2,3-diphenyl-2,3-dimethylbutane, which has the following structure:

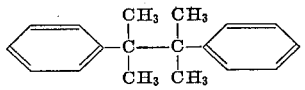

During the dimerization process, however, certain side reaction products can arise from radical attack, these reaction products being in the nature of impurities. A side reaction product resulting from radical attack at the aromatic ring during the dimerization of cumene is represented by the following structure:

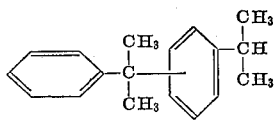

A side reaction product arising from radical attack at the primary hydrogen atom is represented by the following structure:

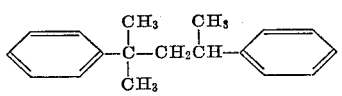

Although the side reaction products illustrated above are not within the generic formula which defines the fluids of the present invention, their presence as minor components in a reduced cumene dimer mixture for power transmission applications would be acceptable because the mixture consists mainly of the more oxidatively stable 2,3-dicyclohexyl-2,3-dimethylbutane.

In conventional process practices, recrystallization steps are sometimes omitted for economic reasons. The fluids taught by the present invention, therefore, are understood to include not only the tetraalkyl substituted alkylene-linked cyclohexyl compounds per se, but also certain side reaction products which may result from omission of the recrystallization step in the preparation of the principal compound. The fluids of the present invention may include up to about 20% of reduced dimeric side reaction products which can arise from radical attack, for example, on the aromatic ring and/or at the primary hydrogen site.

The following Example 2 describes a method of preparing 3,4-dicyclohexyl-3,4-dimethylhexane, another tetraalkyl substituted alkylene-linked cyclohexyl ring compound within the scope of this invention, having the chemical structure:

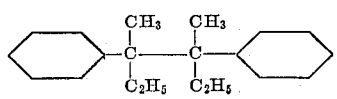

EXAMPLE 2

3,4-dicyclohexyl-3,4-dimethylhexane 3,4-diphenyl-3,4-dimethylhexane (312 g., 0.12 mole; M.P. 87–94° C.), 3 g. of 5% rhodium-on-carbon and 100 ml. of methylcyclohexane were hydrogenated at 200° C. (3,000 p.s.i.) for 6 hours. The cooled reactants were filtered, the filtrate concentrated in vacuo and the concentrates vacuum-distilled. The desired hydrocarbon, 3,4-dicyclohexyl - 3,4 - dimethylhexane, was collected as a water-white liquid boiling principally at 113° C./0.03 mm.

3,4-diphenyl-3,4-dimethylhexane was prepared by reacting 146.2 g. (1 mole) of di-t-butyl peroxide with 648 g. (4.8 moles) of sec-butylbenzene. Excess sec-butylbenzene (335 g., 2.5 moles) was recovered by distillation under reduced pressure with mild heating (B.P. 74° C./ 32 mm.). The concentrated reaction products were distilled under vacuum and the major fraction collected at 117–125° C./0.2 mm. as a colorless liquid which solidified upon standing (136 g.). This solid was recrystallized from ethanol at room temperature to give the meso isomer of 3,4-diphenyl-3,4-dimethylhexane, M.P. 87–94° C.

The following Example 3 describes a method of preparing 2,3 - di(4 - methylcyclohexyl)-2,3-dimethylbutane, another alkylene-linked cyclohexyl ring compound within the present scope, its chemical structure being:

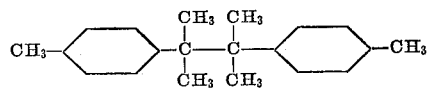

EXAMPLE 3

2,3-di(4-methylcyclohexyl)-2,3-dimethylbutane

A mixture of 2,3-dimethyl-2,3-di(p-tolyl)butane (100 g., 0.37 mole; M.P. 156–159° C.), 5 g. of 5% rhodium-on-carbon and 100 ml. of methylcyclohexane was heated at 200° C. (3,000 p.s.i. H₂) for 6 hrs. The cooled reactants were filtered, the filtrate concentrated in-vacuo with mild heating and the concentrates vacuum-distilled. The desired hydrocarbon, 2,3-di(4-methylcyclohexyl)-2,3-dimethylbutane, was collected as a water-white liquid boiling principally at 110° C./0.1 mm.

2,3-dimethyl-2,3-di(p-tolyl) butane was prepared by reacting 292.5 g. (2 moles) of di-t-butyl peroxide with 1157 g. (8.6 moles) of p-cymene. Excess p-cymene (755 g., 5.6 moles) was recovered by distillation under reduced pressures (B.P. 78° C./33 mm.). The concentrated reaction products solidified and were purified to the desired hydrocarbon by recrystallization from heptane, M.P. 156–159° C.

In the synthetic fluids taught by the present invention, the alkylene link connecting the two cyclohexyl rings is two carbon atoms in length. It was discovered herein that such a configuration leads to superior oxidative stability. With methyl substituents on this alkylene link, the preferred compound 2,3-dicyclohexyl-2,3-dimethylbutane results. Ethyl and propyl substituents on the alkylene link are also within the scope of this invention. It has also been found that a methyl or ethyl group can be substituted within each of the two cyclohexyl rings.

For certain applications, it may be advantageous to employ for a base stock a blend or mixture of one or more of the synthetic compounds taught herein. Thus, a desired balance of physical properties may be attained with other than a single compound.

In the practice of the present invention it may be advantageous to employ as the fluid base stock one of the compounds taught herein, while adding thereto an additive package and, if desirable, another synthetic fluid outside the instant scope. The outstanding fluids of the present invention, therefore, may only be present in, for example, about 80% by weight of the total composition while still achieving superior results.

When used in a conventional automatic transmission as the operative fluid, the synthetic compounds of the present invention would normally be contained in the outer casing of the transmission unit, which casing is attached to the typical engine crankshaft and flywheel and rotates therewith. Within the fluid is a coupling comprising an impeller connected to the outer casing and a turbine which is connected to the drive shaft of the vehicle. The turbine is driven by the hydrokinetic energy of the fluid in response to the rotation of the impeller, as the casing to which the impeller is attached is activated by the crankshaft and flywheel.

Although 2,3-dicyclohexyl-2,3-dimethylbutane has been shown herein to have particular advantage as an automatic transmission fluid, the compound's utility is not so limited. The outstanding viscosity characteristics and oxidative stability of 2,3-dicyclohexyl-2,3-dimethylbutane make it a superior operating fluid in many other hydraulic systems and devices. A typical hydraulic system includes one or more displaceable members and a displacing force which is transmitted to said members by means of an operative fluid which is in communication therewith. While hydraulic systems will contain such elements as pumps, valves, cylinders, pistons and the like, the performance and endurance of the system necessarily depends upon the operative fluid. The viscosity characteristics of 2,3-dicyclohexyl-2,3-dimethylbutane make it advantageous for the transmission of power in a hydraulic system having a pump therein which supplies power for the system, e.g., in a fluid motor comprising a constant-discharge or variable-discharge piston pump which is caused to rotate by the pressure of the hydraulic fluid of the system. The preferred fluid likewise serves to lubricate the frictional parts of such hydraulic systems. The outstanding oxidative stability of 2,3-dicyclohexyl-2,3-dimethylbutane promotes cleanliness of a hydraulic system because of the resistance to sludge formation, deposits, corrosive attack and the like. The hydraulic systems envisioned in the present invention are understood to contain conventional fluid reservoir and fluid supply means.

The fluids employed in the present invention, therefore, are useful as hydraulic fluids in many types of hydraulic machines, e.g., lifts, hoists, jacks, lock-gates, presses, etc. They are likewise useful as the operative fluid in hydraulic steering mechanisms, wet clutches and other mechanical devices.

While this invention has been described with respect to certain specific embodiments, it is not so limited, and it is to be understood that variations and modifications thereof may be made without departing from the spirit of the following claims.

The embodiments of this invention in which an exclusive property or privilege is claimed are defined as follows:

1. In a method of transmitting power by the hydrokinetic action of a fluid, the improvement which comprises using as said fluid a tetraalkyl-substituted alkylene-linked dicyclohexyl compound represented by the structure

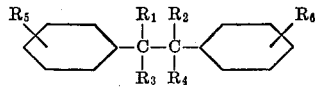

where $R_1$, $R_2$, $R_3$ and $R_4$ are $C_1$ to $C_3$ alkyl and can be the same or different, and $R_5$ and $R_6$ are selected from the group consisting of $C_1$ to $C_2$ alkyl and hydrogen, and can be the same or different.

2. A method of claim 1 wherein the fluid is a tetraalkyl-substituted alkylene-linked dicyclohexyl compound represented by the structure

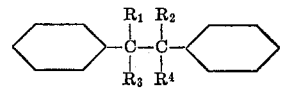

where $R_1$, $R_2$, $R_3$ and $R_4$ are $C_1$ to $C_3$ alkyl and can be the same or different.

3. A method of claim 1 wherein the fluid is 2,3-dicyclohexyl-2,3-dimethylbutane.

4. A method of claim 1 wherein the compound contains a viscosity index improver in an amount effective to improve the viscosity index of said compound.

5. A method of claim 1 wherein the fluid is a mixture of two or more compounds within said structure.

6. In a method of operating an automatic transmission wherein power is transmitted by the hydrokinetic action of a fluid, the improvement consisting essentially of using in said transmission a fluid comprising at least 80% by weight of 2,3-dicyclohexyl-2,3-dimethylbutane.

References Cited

UNITED STATES PATENTS

| | | | |
|---|---|---|---|
| 2,933,450 | 4/1960 | Lyding | 252—73 |
| 3,203,186 | 8/1965 | Sheppard | 252—73X |
| 3,322,841 | 5/1967 | Geering | 252—73X |

OTHER REFERENCES

Chemical Abstracts, vol. 64, 15774h.

HERBERT B. GUYNN, Primary Examiner

D. SILVERSTEIN, Assistant Examiner